United States Patent
Grisdale

[15] 3,694,462
[45] Sept. 26, 1972

[54] BENZO[b]PYRYLIUM DYE SALTS

[72] Inventor: Patrick J. Grisdale, Rochester, N.Y.

[73] Assignee: Eastman Kodak Company, Rochester, N.Y.

[22] Filed: March 2, 1970

[21] Appl. No.: 15,832

[52] U.S. Cl. ............... 260/345.2, 252/501, 96/89
[51] Int. Cl. ................................................. C07d 7/24
[58] Field of Search ............................. 260/345.2

[56] References Cited

UNITED STATES PATENTS 3,314,975   4/1967   Jurd ..................... 260/345.2
3,554,745   1/1971   Van Allan ............. 260/345.2

Primary Examiner—John M. Ford
Attorney—W. H. J. Kline, Paul R. Holmes and J. William Berkstresser

[57] ABSTRACT

A class of novel benzo[b]pyrylium dye salts having a partially saturated, bicyclic ring system fused thereto is described.

4 Claims, No Drawings

BENZO[b]PYRYLIUM DYE SALTS

This invention relates to a novel class of benzo[b] pyrylium dye salts and in particular to such dyes having a partially saturated, bicyclic ring system fused thereto.

Compounds of the hereinafter described benzo[b]pyrylium dye salts with partially saturated bicyclic ring systems fused thereto are more rigid in configuration than pyrylium dyes not containing this fused configuration. Such dye salts have a utility for sensitization of photoconductors and electrophotographic systems, as well as for other light sensitive systems. Further such dyes are unusually well suited for dye laser applications.

It is therefore an object of this invention to provide novel pyrylium dyes as hereinafter described having the sensitizing and lasing ability mentioned.

The compounds of the present invention have a structure conforming to the following general formula:

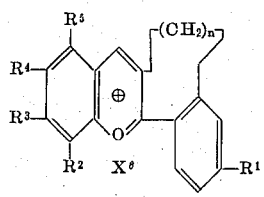

wherein $R^1$ is a hydrogen atom, an alkoxy group having one to six carbon atoms, an alkyl group having one to 12 carbon atoms, or a dialkylamino group wherein each alkyl substituent of the dialkylamino group has one to four carbon atoms; $R^2$, $R^3$, $R^4$ and $R^5$ are each a hydrogen atom or one of the pairs of groups $R^2$ and $R^3$, $R^3$ and $R^4$, or $R^4$ and $R^5$ are taken together to be a 1,3-butadienylene group

, while the remaining $R^2$, $R^3$, $R^4$, and $R^5$ groups are hydrogen atoms; $n$ is an integer from 1 to 4; and $X^\ominus$ is an acid anion such as halide, perchlorate, tetrafluoroborate, sulfate, bromate, carbonate, periodate, alkylsulfonate, arylsulfonate, and the like.

Compounds having the hereinbefore described general formula can be prepared by the reaction of an orthohydroxy aromatic aldehyde with a cyclic benzo ketone in the presence of acetic acid and a stream of hydrogen chloride gas. Generally, perchlorate acid is also added to the reaction mixture to facilitate isolation of the reaction product as the perchlorate salt which precipitates from the reaction mixture. The general preparation is illustrated by the following reaction

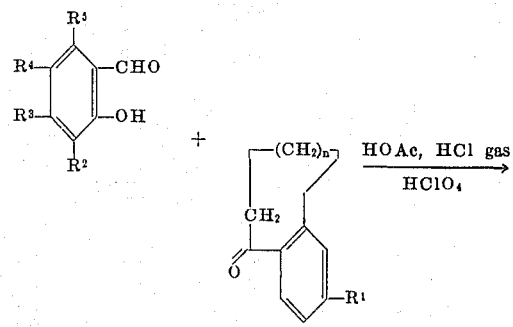

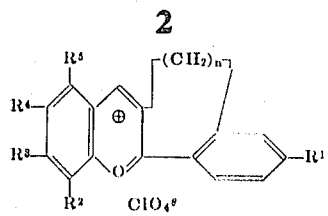

In a typical preparation the mixture of 0.1 mole of an orthohydroxy aromatic aldehyde, 0.1 mole of cyclic ketone, 100 ml of acetic acid and 25 ml of 70 percent solution of perchloric acid are warmed on a steambath for about 30 minutes while bubbling a stream of dry hydrogen chloride gas through the reaction mixture. The mixture is cooled and the precipitated product isolated by filtration and then recrystallization from acetic acid, acetonitrile or mixtures of the two. The following examples illustrate specific preparations of compounds of the present invention using the hereinbefore described reaction procedure.

EXAMPLE 1

12,13-Dihydro-10-methoxy-dibenzo[a,h]xanthylium perchlorate having the following structure

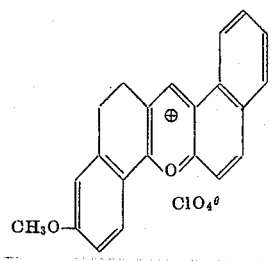

is prepared by mixing 0.1 mole of 2-hydroxy-1-naphthaldehyde with 0.1 mole of 6-methoxy-1-tetralone. The product was recrystallized from acetonitrile in a 42 percent yield at a melting point range of 272° to 275° C. The elemental analysis comparing the calculated amounts/amounts found, showed the following: C 64.0/64.4; H 4.1/4.4; Cl 8.6/8.5.

EXAMPLE 2

10-methoxy-12H-indeno[3,2-b]-naphtho[1,2-e]pyrylium perchlorate having the following structure

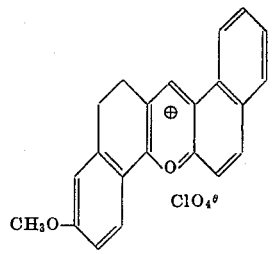

is prepared by mixing 0.1 mole of 2-hydroxy-1-naphthaldehyde with 0,1 mole of 5-methoxy-1-indanone. The product was recrystallized from acetic acid in a 55 percent yield at a melting point range of 283° to 285° C. The elemental analysis comparing the calculated amounts/amounts found, showed the following: C 63.2/62.9; H 3.8/4.1; Cl 8.9/9.1.

EXAMPLE 3

1,2-dihydro-4-methoxy-benzo[c]xanthylium perchlorate having the following structure

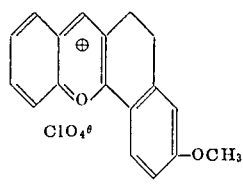

is prepared by mixing 0.1 mole of salicylaldehyde with 0.1 mole of 6-methoxy-1-tetralone. The product was recrystallized from acetonitrile in an 85 percent yield at a melting point range of 245° C.

EXAMPLE 4

Benzocyclohept[5,4-b]-naphtho[1,2-e]pyrylium perchlorate having the following structure

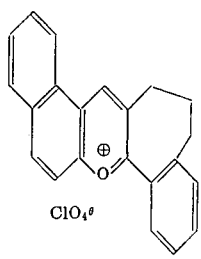

is prepared by mixing 0.1 mole of 2-hydroxy-1-naphthaldehyde with 0.1 mole of benzocyclo-heptan-1-one. The product was recrystallized from acetonitrilelacetic acid 1:1 in an 85 percent yield at a melting point range of 250° to 251° C. The elemental analysis comparing the calculated amounts/amounts found, showed the following: C 66.6/66.5; H 4.3/3.9; Cl 8.9/8.9.

EXAMPLE 5

12H-indeno[3,2-b]naphtho-[1,2-e]pyrylium perchlorate having the general structure

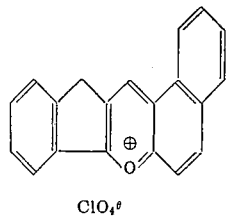

is prepared by mixing 0.1 mole of 2-hydroxy-1-naphthaldehyde with 0.1 mole of 1-indanone. The product was recrystallized from acetonitrile/acetic acid 1:1 in an 82 percent yield at a melting point range of greater than 300° C. The elemental analysis comparing the calculated amounts/amounts found, showed the following: C 65.2/65.0; H 3.5/3.7; Cl 9.6/9.8.

EXAMPLE 6

12,13-dihydrodibenzo[a,h]-xanthylium perchlorate having the general structure

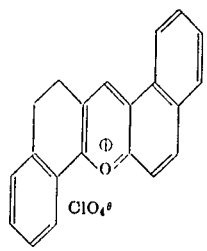

is prepared by mixing 0.1 mole of 2-hydroxy-1-naphthaldehyde with 0.1 mole of 1-tetralone. The product was recrystallized from acetonitrile/acetic acid 1:1 in a 68 percent yield at a melting point range of 280° C. The elemental analysis comparing the calculated amounts/amounts found, showed the following: C 65.8/66.1; H 3.9/4.1; Cl 9.3/9.4.

EXAMPLE 7

8-methoxy-10H-indeno-[2,3-e]benzo[b]pyrylium perchlorate having the general structure

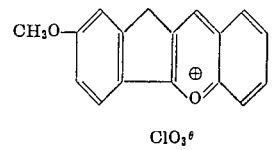

is prepared by mixing 0.1 mole of salicylaldehyde with 0.1 mole of 5-methoxy-1-indanone. The product was recrystallized from acetonitrile in a 72 percent yield at a melting point range of 244° to 245° C. The elemental analysis comparing the calculated amounts/amounts found, showed the following: C 58.5/58.2; H 3.8/4.0; Cl 10.2/10.1.

The hereinbefore described class of compounds are useful as sensitizers for electrophotographic systems as demonstrated by the following results.

The compound of Example 2, 10-methoxy-12H-indeno[3,2-b]-naphtho[1,2-e]pyrylium perchlorate and the compound of Example 3, 1,2-dihydro-4-methoxy-benzo[c]xanthylium perchlorate were used to sensitize photoconductive coatings containing triphenylamine and 4,4'-bis(diphenylamino)chalcone respectively. The following table indicates that the photoconductors in conjunction with the compounds in a Vitel PE101, a polyester resin sold by the Goodyear Tire Company comprising poly(4,4'-isopropylidene-bis-phenyleneoxyethylene-co-ethylene terephthalate), matrix produce photoconductive compositions having useful electrical "H and D" shoulder and toe speeds. The Vitel binder is generally used with 20 percent by weight of the photoconductor and 0.8 percent by weight of sensitizer compound.

TABLE I

| Sensitizer Compound | Organic Photo Conductor | Elec. "H and D" Speeds Shoulder/100 Volts (+) | Toe (−) |
| --- | --- | --- | --- |
| 10-methoxy-12H-indeno[3,2-b]naphtho[1,2-e]pyrylium perchlorate | triphenylamine | 50/0 | 45/0 |
| same | 4,4'-bis(diphenylamino)chalcone | 630/20 | 500/5 |
| 1,2-dihydro-4-methoxy-benzo[c]xanthylium perchlorate | triphenylamine | 400/50 | 230/20 |
| same | 4,4'-bis(diphenylamino(chalcone | 630/85 | 120/10 |

Further explanation of significance of the electrical H and D speeds can be found by reference to the explanation in U.S. Pat. No. 3,449,658, Robinson et al., issued June 10, 1969.

Utility of these compounds as lasers is described in copending U.S. Application Ser. No. 15,489, filed Mar. 2, 1970 by George A. Reynolds et al.

The invention has been described in detail with particular reference to preferred embodiments thereof, but it will be understood that variations and modifications can be effected within the spirit and scope of the invention.

We claim:
1. 10-methoxy-12H-indeno[3,2-b]-naphtho[1,2-e]pyrylium perchlorate.
2. Benzocyclohept[5,4-b]-naphtho[1,2-e]pyrylium perchlorate.
3. 12H-indeno[3,2-b]naphtho-[1,2-e]pyrylium perchlorate.
4. 8-methoxy-10H-indeno-[2,3-e]benzo[b]pyrylium perchlorate.

* * * * *